United States Patent
Kadambande et al.

(10) Patent No.: US 6,476,121 B1
(45) Date of Patent: Nov. 5, 2002

(54) AQUEOUS ACRYLIC HOUSE PAINT WITH A BRANCHED POLYOL ADDITIVE

(75) Inventors: Vijay Kadambande, Münster (DE); Heinz-Peter Rink, Münster (DE); Detlef Thiel, Köln (DE); Ernst Häring, Bergheim (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/856,952

(22) PCT Filed: Oct. 22, 1999

(86) PCT No.: PCT/EP99/08038

§ 371 (c)(1), (2), (4) Date: Jul. 26, 2001

(87) PCT Pub. No.: WO00/32703

PCT Pub. Date: Jun. 8, 2000

(30) Foreign Application Priority Data

Nov. 30, 1998 (DE) .......................................... 198 55 116

(51) Int. Cl.[7] ........................ C08L 33/04; C08L 33/08; C08L 33/10

(52) U.S. Cl. ...................... 524/560; 524/268; 524/386; 524/431; 524/547; 524/548; 524/556; 524/558; 524/561; 524/562; 524/523; 524/507; 524/513; 524/604

(58) Field of Search .............................. 524/268, 386, 524/431, 507, 513, 523, 547, 548, 556, 558, 560, 561, 562, 604

(56) References Cited

U.S. PATENT DOCUMENTS 4,477,608 A  *  10/1984   Babler et al. ................ 252/512

OTHER PUBLICATIONS

Patent Abstract for JP 600 48 902, Kadota Ryusaburo, May 16, 1985 entitled "Mosquito–"Mosquito–Repellent Incense Mat.

* cited by examiner

*Primary Examiner*—Judy M. Reddick

(57) ABSTRACT

An architectural coating material comprising a) an aqueous dispersion of at least one polyacrylate and b) at least one branched, cyclic and/or acyclic $C_9$–$C_{16}$ alkane functionalized with at least two hydroxyl groups.

15 Claims, No Drawings

AQUEOUS ACRYLIC HOUSE PAINT WITH A BRANCHED POLYOL ADDITIVE

The present invention relates to a novel water-dilutable architectural coating material, to a process for preparing it, and to its use.

The adjustment and improvement of the properties of water-dilutable architectural coating materials based on polymer resin dispersions generally necessitates auxiliaries. This is so in particular for the improvement of leveling, the prolongation of the open time, the lowering of the minimum film formation temperature (MFFT) in accordance with DIN 53787, and the avoidance of intensive odors.

In particular, too short an open time of an architectural coating material may severely restrict its scope for application in practice. For instance, where parts with a large surface area, such as doors, are to be provided with a water-dilutable architectural coating material in one coat and where this coat, as is common in practice, is to be finished again after coating in tracks, the coat is found to have already undergone partial drying, or at least thickening by loss of solvent and/or water, owing to an inadequate open time. Overlap marks and a stripy appearance are the consequences. In the case of roller application, the resulting appearance fails to match the requirements, for the same reasons. The roller pattern is very largely maintained owing to the excessively rapid increase in consistency.

In order to master these problems, it is known to use organic solvents or plasticizers. As well as improving film formation (acting as coalescents) the solvents are intended to have a positive influence on leveling and open time and, unlike the plasticizers, to leave the architectural coating film as quickly as possible without giving rise to any odor nuisance. None of the coalescents known to date meets all of these requirements.

The very frequently used, customary and known coalescent 2,2,4-trimethyl-1,3-pentanediol monoisobutyrate, although indeed lowering the minimum film formation temperature, has virtually no positive influence on the open time and the leveling. Moreover, it has a persistently unpleasant odor.

Customary and known plasticizers, on the other hand, while departing the architectural coating film very slowly, are nevertheless unable to prolong the open time adequately.

The methods known to date of adjusting and improving these important performance properties still have disadvantages which stand in the way of more widespread use of the water-dilutable coating materials, especially in professional application.

It is an object of the present invention to provide a new water-dilutable architectural coating material which no longer has the disadvantages of the prior art but which instead possesses not only a markedly reduced minimum film formation temperature and thus improved frost resistance but also has a significantly longer open time in conjunction with better leveling. Furthermore, the new water-dilutable architectural coating materials should no longer give rise to any odor nuisance.

The invention accordingly provides the novel water-dilutable architectural coating material comprising a) an aqueous dispersion of at least one polyacrylate and
b) at least one branched, cyclic and/or acyclic $C_9$–$C_{16}$ alkane functionalized with at least two hydroxyl groups.

In the text below, the novel water-dilutable architectural coating material is referred to as the "coating material of the invention".

In the light of the prior art it was unforeseeable that the object might be achieved by means of the branched, cyclic and/or acyclic $C_9$–$C_{16}$ alkanes b) for use in accordance with the invention, functionalized with at least two hydroxyl groups, since there was a risk that these compounds too would have the disadvantages of the conventional coalescents. Instead, contrary to expectations, it was found that the branched, cyclic and/or acyclic $C_9$–$C_{16}$ alkanes b) for use in accordance with the invention, functionalized with at least two hydroxyl groups, do not give rise to any odor nuisance and, as intended, are volatilized from the coating film at an evaporation rate which ensures a long open time. Moreover, they support film formation by reducing the minimum film formation temperature and at the same time lowering the freezing point of the novel architectural coating materials. This is so because, in contradistinction to a large proportion of the customary coalescents, they do not incipiently dissolve a first coat to such an extent that the surface properties of the second coat are impaired.

In the text below, the branched, cyclic and/or acyclic $C_9$–$C_{16}$ alkanes b) for use in accordance with the invention, functionalized with at least two hydroxyl groups, are referred to for the sake of brevity as "functionalized alkanes b)".

The functionalized alkanes b) that are important to the invention are derived from branched, cyclic or acyclic alkanes having from 9 to 16 carbon atoms which in each case form the framework.

Examples of suitable alkanes of this kind having 9 carbon atoms are 2-methyloctane, 4-methyloctane, 2,3-dimethylheptane, 3,4-dimethylheptane, 2,6-dimethylheptane, 3,5-dimethylheptane, 2-methyl-4-ethylhexane, and isopropylcyclohexane.

Examples of suitable alkanes of this kind having 10 carbon atoms are 4-ethyloctane, 2,3,4,5-tetramethylhexane, 2,3-diethylhexane, and 1-methyl-2-n-propylcyclohexane.

Examples of suitable alkanes of this kind having 11 carbon atoms are 2,4,5,6-tetramethylheptane and 3-methyl-6-ethyloctane.

Examples of suitable alkanes of this kind having 12 carbon atoms are 4-methyl-7-ethylnonane, 4,5-diethyloctane, 1-ethylbutylcyclohexane, 3,5-diethyloctane, and 2,4-diethyloctane.

Examples of suitable alkanes of this kind having 13 carbon atoms are 3,4-dimethyl-5-ethylnonane and 4,6-dimethyl-5-ethylnonane.

An example of a suitable alkane of this kind having 14 carbon atoms is 3,4-dimethyl-7-ethyldecane.

Examples of suitable alkanes of this kind having 15 carbon atoms are 3,6-diethylundecane and 3,6-dimethyl-9-ethylundecane.

Examples of suitable alkanes of this kind having 16 carbon atoms are 3,7-diethyldodecane and 4-ethyl-6-isopropylundecane.

Of these frameworks, the alkanes having from 10 to 14 and in particular 12 carbon atoms are particularly advantageous and are therefore used with preference. Of these, in turn, the octane derivatives are especially advantageous.

For the present invention it is important that the functionalized alkanes b) which are derived from these branched, cyclic or acyclic alkanes as frameworks are liquid at room temperature. Accordingly it is possible to use either individual liquid functionalized alkanes b) or liquid mixtures of these compounds. This is especially the case when using functionalized alkanes b) which, owing to their high number of carbon atoms in the alkane framework, are solid in the form of individual compounds. The skilled worker will therefore be able to select the corresponding functionalized alkanes b) in a simple manner.

For the invention it is also important that the functionalized alkanes b) have a boiling point of more than 200, preferably more than 220, and in particular more than 240° C. Additionally, they should have a low evaporation rate.

For the coating of the invention it is of advantage if the functionalized alkanes b) are acyclic.

The functionalized alkanes b) have primary and/or secondary hydroxyl groups. For the coating materials of the invention it is of advantage if primary and secondary groups of this kind are present in one compound.

The functionalized alkanes b) accordingly comprise polyols b). These compounds may be used individually or together in the form of mixtures. Particular advantages arise if the polyols b) are diols and/or triols, but especially diols. For this reason they are used with very particular preference.

Especially advantageous coating materials of the invention are obtained if the polyols b) are positionally isomeric dialkyloctanediols, especially diethyloctanediols. Outstanding results are obtained using 2,4-diethyl-1,5-octanediol.

The above-described functionalized alkanes b) are compounds known per se and may be prepared with the aid of customary and known synthesis methods of organic chemistry, such as base catalyzed aldol condensation, or are obtained as byproducts of large-scale chemical synthesis such as the preparation of 2-ethylhexanol.

The functionalized alkanes b) are generally present in the coating material of the invention in an amount of from 0.01 to 10, preferably from 0.1 to 8, with particular preference from 0.5 to 5, and in particular from 0.8 to 2% by weight, based on the overall amount of the coating material of the invention. Although they may be present in larger amounts therein, the range indicated is an advantageous range within which the advantages of the invention are securely and reliably achieved. Within this range, that from 0.1 to 8% by weight is of particular advantage, since the coating materials of the invention containing this amount of functionalized alkanes b) have a particularly advantageous profile of properties. Very particular advantages, however, result from the use of from 0.8 to 2% by weight of functionalized alkanes b).

The further key constituent of the coating material of the invention is the dispersion a).

The dispersion a) for use in accordance with the invention consists substantially of two constituents: an aqueous medium, especially water, and a polyacrylate.

In the context of the present invention the term "aqueous medium" refers to a solution consisting substantially of water with solid, liquid and/or gaseous organic and/or inorganic substances dissolved and dispersed therein. Examples of suitable substances of this kind are customary and known, water-miscible solvents, ammonia, amines or salts.

The polyacrylates dispersed in the aqueous medium preferably comprise polyacrylates prepared by emulsion polymerization. In this context, polyacrylates with a number average molecular weight Mn of from 50000 to 2500000, in particular from 100000 to 1500000, are of advantage and are therefore used with very particular preference.

The emulsion polymerization method is customary and known in the field of polyacrylates and is described, for example, in the textbook by B. Vollmert, "Grundriβder Makromolekularen Chemie" [Outline of macromolecular chemistry], Volume I, structural principles, polymer syntheses I [addition polymerization], E. Vollmert-Verlag, Karlsruhe, 1979, pages 181 to 195, or in the patent EP-A-0 761 778.

The polyacrylates for use in accordance with the invention are prepared from a1) a (meth)acrylic ester which is substantially free from acid groups and is copolymerizable with but different than (a2), (a3), (a4), (a5), (a6), and (a7); or a mixture of such monomers, a2) if desired, an ethylenically unsaturated monomer which carries at least one hydroxyl group per molecule and is substantially free from acid groups, and which is copolymerizable with (a1), (a3), (a4), (a5), (a6), and (a7) but different than (a5); or a mixture of such monomers, a3) an ethylenically unsaturated monomer which carries per molecule at least one acid group which can be converted into the corresponding acid anion group, and is copolymerizable with (a1), (a2), (a4), (a5), (a6), and (a7); or a mixture of such monomers, a4) if desired, one or more vinylaromatic hydrocarbons, a5) if desired, at least one reaction product of acrylic acid and/or methacrylic acid with the glycidyl ester of an alpha-branched monocarboxylic acid having from 5 to 18 carbon atoms per molecule (e.g., the glycidyl esters available commercially under the names Cardura®) or, instead of the reaction product, an equivalent amount of acrylic and/or methacrylic acid which is then reacted during or after the polymerization reaction with the glycidyl ester of an alpha-branched monocarboxylic acid (e.g., the glycidyl esters available commercially under the names Cardura®) having from 5 to 18 carbon atoms per molecule, a6) if desired, at least one polysiloxane macromonomer, and also a7) if desired, an ethylenically unsaturated monomer which is substantially free from acid groups and is different than but copolymerizable with (a1), (a2), (a3), (a4), (a5), and (a6); or a mixture of such monomers, the nature and amount of (a1), (a2), (a3), (a4), (a5), (a6), and (a7) being selected such that the polyacrylate has the desired OH number, acid number and molecular weight.

For preparing the polyacrylate used in accordance with the invention it is possible as obligatory monomer (a1) to use any ester of (meth)acrylic acid that is substantially free from acid groups and is copolymerizable with (a2), (a3), (a4), (a5), (a6), and (a7); or a mixture of such (meth)acrylic esters. Examples include alkyl acrylates and alkyl methacrylates having up to 20 carbon atoms in the alkyl radical, such as methyl, ethyl, propyl, n-butyl, secbutyl, tert-butyl, hexyl, ethylhexyl, stearyl and lauryl acrylate or methacrylate, or cycloaliphatic (meth)acrylic esters, such as cyclohexyl (meth)acrylate, isobornyl (meth)acrylate, dicyclopentadienyl (meth)acrylate and tert-butylcyclohexyl (meth)acrylate.

As monomer (a1) it is also possible to use ethyl triglycol (meth)acrylate and methoxyoligoglycol (meth)acrylate having a number average molecular weight Mn of preferably 550, or other ethoxylated and/or propoxylated, hydroxyl-free (meth)acrylic acid derivatives.

As optional monomer (a2) it is possible to use ethylenically unsaturated monomers which carry at least one hydroxyl group per molecule and are substantially free from acid groups, and are copolymerizable with (a1), (a3), (a4), (a5), (a6), and (a7) but different than (a5); or a mixture of such monomers. Examples include hydroxyalkyl esters of acrylic acid, methacrylic acid or another alpha,beta-ethylenically unsaturated carboxylic acid. These esters may be derived from an alkylene glycol which is esterified with the acid or may be obtained by reacting the acid with an alkylene oxide. As component (a2) it is preferred to use hydroxyalkyl esters of acrylic acid or methacrylic acid in which the hydroxyalkyl group contains up to 20 carbon atoms, reaction products of cyclic esters, such as epsilon-caprolactone, and these hydroxyalkyl esters, or mixtures of these hydroxyalkyl esters and/or epsilon-caprolactone-modified hydroxyalkyl esters.

Examples of such hydroxyalkyl esters include 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, methylpropanediol monoacrylate, methylpropanediol monomethacrylate, hydroxystearyl acrylate, and hydroxystearyl methacrylate. Corresponding esters of other unsaturated acids, such as ethacrylic acid, crotonic acid and similar acids having up to about 6 carbon atoms per molecule, for example, may also be used.

It is also possible as monomers (a2) to use olefinically unsaturated polyols, such as trimethylolpropane monoallyl ether. The fraction of trimethylolpropane monoallyl ether is usually up to 10% by weight, based on the overall weight of the monomers (a1) to (a7) used to prepare the polyacrylate resin. Additionally, however, it is also possible to add up to 10% by weight, based on the overall weight of the monomers used to prepare the polyacrylate resin, of trimethylolpropane monoallyl ether to the finished polyacrylate resin. The olefinically unsaturated polyols, such as trimethylolpropane monoallyl ether in particular, may be used as sole hydroxyl-containing monomers, but in particular may be used proportionally in combination with other of the abovementioned hydroxyl-containing monomers (a2).

As obligatory monomer (a3) it is possible to use any ethylenically unsaturated monomer which carries per molecule at least one acid group, preferably a carboxyl group, and is copolymerizable with (a1), (a2), (a4), (a5), (a6), and (a7); or a mixture of such monomers. Acrylic acid and/or methacrylic acid are/is used with particular preference as monomer (a3). It is, however, also possible to use other ethylenically unsaturated carboxylic acids having up to 6 carbon atoms per molecule. Examples of such acids include ethacrylic acid, crotonic acid, maleic acid, fumaric acid, and itaconic acid. It is also possible, for example, to use ethylenically unsaturated sulfonic or phosphonic acids, and/or their partial esters, as component (a3). Mono(meth) acryloyloxyethyl maleate, succinate and phthalate may also be used as monomer (a3).

As optional monomers (a4) use is made of vinylaromatic hydrocarbons, such as styrene, alpha-alkylstyrenes such as alpha-methylstyrene, alpha-arylstyrenes such as 1,1-diphenylethene, or ring-alkylated styrenes such as vinyltoluene.

As optional monomer (a5) use is made of the reaction product of acrylic and/or methacrylic acid with the glycidyl ester of an alpha-branched monocarboxylic acid having from 5 to 18 carbon atoms per molecule. The reaction of acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic acid. This glycidyl ester is available commercially under the name "Cardura E10".

Particular preference is given, owing to their ready availability, to using vinyl ester s of saturated aliphatic monocarboxylic acids having 9 to 11 carbon atoms which are branched on the alpha carbon atom.

The polyacrylates for use in accordance with the invention may also contain in copolymerized form a polysiloxane macromonomer (a6).

Suitable polysiloxane macromonomers (a6) are those having a number average molecular weight Mn of from 1000 to 40000, preferably from 2000 to 20000, with particular preference from 2500 to 10000, and in particular from 3000 to 7000, and containing on average 0.5 to 2.5, preferably from 0.5 to 1.5, ethylenically unsaturated double bonds per molecule.

Suitable examples include the polysiloxane macromonomers described in DE-A-38 07 571 on pages 5 to 7, in DE-A 37 06 095 in columns 3 to 7, in EP-B-0 358 153 on pages 3 to 6, and in U.S. Pat. No. 4,754,014 in columns 5 to 9. Furthermore, other acryloxysilane-containing vinyl monomers having the abovementioned molecular weights and ethylenically unsaturated double bond contents are also suitable, examples being compounds preparable by reacting hydroxy-functional silanes with epichlorohydrin and then reacting that reaction product with methacrylic acid and/or hydroxyalkyl esters of (meth)acrylic acid.

Used with particular preference as component (a6) are the polysiloxane macromonomers listed in DE-A 44 21 823.

Examples of polysiloxane macromonomers suitable as component (a6) are also the compounds specified in the international patent application having the publication number WO 92/22615 on page 12 line 18 to page 18 line 10.

The polysiloxane macromonomers (a6) are available on the market and are sold, for example, under the brand name Marubeni$^R$ AK5 by Toagosei.

As optional monomers (a7) it is possible to use all ethylenically unsaturated monomers which are substantially free from acid groups and are copolymerizable with but different than (a1), (a2), (a3), (a4), (a5), and (a6); or mixtures of such monomers.

As monomers (a7) it is also possible to use one or more vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may contain both branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters may be prepared conventionally from the acids, for example, by reacting the acid with acetylene. Further examples of suitable vinyl esters (a7) are vinyl acetate, vinyl propionate, and vinyl butyrate.

Further suitable optional monomers (a7) include (meth) acrylic esters or vinyl esters such as (meth)acrylic acid pentane-2,4-dione-1-yl ester or acetoacetic acid vinyl ester, by means of which carbonyl side groups, especially activated carbonyl groups such as diketone groups, may be introduced into the polyacrylates.

Polyacrylates which are advantageous in accordance with the invention are those containing exclusively the monomers (a1) and (a3) in copolymerized form. They are therefore used with particular preference.

The polyacrylates for use in accordance with the invention are customary and known compounds which are available on the market.

Similarly, the dispersions a) for use in accordance with the invention are customary and known products available on the market. An example of a suitable dispersion a) for use in accordance with the invention is sold under the brand name NeoCryl$^R$ XK 90 by Zeneca Resins.

The polyacrylates for use in accordance with the invention are present in the dispersions a) of the invention in an amount of from 20 to 70, preferably from 30 to 60, and in particular from 35 to 55% by weight, based in each case on the dispersion a).

Besides the polyacrylate, the coating material of the invention and/or the dispersion a) present therein may include further polymers in minor amounts. In the context of the present invention, the term "minor amounts" means that the further polymers are to be used in amounts which do not alter the profile of properties of the dispersion a) such as to detract from the advantageous properties resulting from the polyacrylate.

Examples of suitable polymers which may be used alongside the polyacrylate are polyesters, polyurethanes, acrylated polyurethanes, acrylated polyesters, polylacetones, polycarbonates, polyethers and/or (meth)acrylatediols. They are known to the skilled worker, and numerous suitable examples are on the market.

In the coating material of the invention, the dispersion a) for use in accordance with the invention is present in an amount of from 20 to 80, preferably from 30 to 70, and in particular from 45 to 65% by weight, based in each case on the architectural coating material.

Where the polyacrylate for use in accordance with the invention contains carbonyl side groups, it is of advantage to use a crosslinking agent containing hydrazine groups, especially in stoichiometric amounts, as well. An example of a suitable such crosslinking agent is adipic dihydrazide.

The coating material of the invention further comprises additives such as are customary and known in the field of architectural coating materials, in effective amounts. The nature of the additives and their amounts are guided by the visual and technical effects which it is desired to achieve with the architectural coating material of the invention. Accordingly, the skilled worker is able to select the appropriate additives and their amounts on the basis of his or her experience, possibly with the assistance of simple preliminary experiments.

Examples of suitable additives are flatting agents, defoamers, leveling agents, wetting agents, film formation auxiliaries, e.g., cellulose derivatives, waxes, and, in particular, Theological auxiliaries.

Examples of suitable Theological auxiliaries are associative thickeners, especially polyurethane-based ones. These have the following structural features:
- a hydrophilic framework which ensures sufficient solubility in water, and
- hydrophobic groups capable of associative interaction in an aqueous medium.

Examples of suitable hydrophobic groups are long-chain alkyl radicals such as dodecyl, hexadecyl or octadecyl radicals or alkylaryl radicals such as octylphenyl or nonylphenyl radicals.

Examples of suitable hydrophilic frameworks are polyacrylates, cellulose ethers or, in particular, polyurethanes containing the hydrophilic groups as polymer building blocks. Particular preference is given in this context as hydrophilic frameworks to polyurethanes that contain polyether chains, preferably of polyethylene oxide, as building blocks.

In the synthesis of such polyether polyurethanes, the diisocyanates and/or polyisocyanates, preferably aliphatic diisocyanates, especially unsubstituted or alkyl-substituted 1,6-hexamethylene diisocyanate, serve to link the hydroxyl-terminated polyether building blocks to one another and to link the polyether building blocks to the hydrophobic end group building blocks, which may be, for example, monofunctional alcohols and/or amines having the abovementioned long-chain alkyl radicals and/or alkylaryl radicals.

The coating material of the invention further comprises pigments and fillers of any kind, examples including color pigments such as azo pigments, phthalocyanine pigments, carbonyl pigments, dioxazine pigments, titanium dioxide, pigment grade carbon black, iron oxides or chromium oxides and/or cobalt oxides, effect pigments such as metal flake pigments, especially aluminum flake pigments, and pearlescent pigments, or fillers such as chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers or wood flour.

The preparation of the coating material of the invention has no special features in terms of its process technology; instead, it is carried out using the customary methods such as the combining of the individual constituents and their mixing with stirring. In some cases it is possible to mix all of the constituents of the coating material of the invention at once with one another. It frequently proves, however, advantageous to premix some of the constituents separately before then combining the resultant mixture with the other constituents to give the coating material of the invention.

In accordance with the invention it is of particular advantage first to premix the additives separately, with the exception of the pigments and the fillers, and to add the resulting additive mixture to the dispersion a) for use in accordance with the invention. The pigments and/or fillers are then admixed individually to the resultant mixture.

It is also of particular advantage in accordance with the invention first to mix some of the additives with the pigments and/or fillers and also the remaining additives separately, before then adding the two mixtures to the dispersion a) for use in accordance with the invention.

The architectural coating material of the invention has a markedly reduced minimum film formation temperature and thus improved frost resistance and also a longer open time than conventional architectural coating materials having the same composition except for the coalescent. Moreover, the architectural coating material of the invention no longer gives rise to any odor nuisance. It can therefore be stored and applied without problems and without the need to take any special measures.

EXAMPLES AND COMPARATIVE EXPERIMENTS

Example 1

Preparation of an Inventive Stain in a Walnut Shade 55 parts by weight of a 45% by weight polyacrylate dispersion were charged to a laboratory dissolver.

3.5 parts by weight of propylene glycol, 1.5 parts by weight of butyl diglycol, 0.5 part by weight of silicone defoamer (BYK® 024 from Byk Chemie GmbH), 0.4 part by weight of wetting agent (Surfynol$^R$ 104 E from Air Products), 1 part by weight of 2,4-diethyl-1,5-octanediol, 2.2 parts by weight of a polyurethane-based associative thickener (Rheolate$^R$ 278 from Rheox Europe SA/NV) and 1 part by weight of deionized water were mixed with one another separately and the resultant mixture was added to the dispersion with stirring.

The following pigment preparations were added individually to the resultant dispersion:

1.4 parts by weight of transparent red iron oxide (Luconyl$^R$ 2817 from BASF Aktiengesellschaft)

0.7 part by weight of transparent yellow iron oxide (Luconyl$^R$ 1916 from BASF Aktiengesellschaft)

0.2 part by weight of transparent pigment grade carbon black (Luconyl$^R$ 0060 from BASF Aktiengesellschaft).

Thereafter, a further 32.6 parts by weight of deionized water were added.

The resultant architectural coating material of the invention, which was virtually odorless, lent itself to application without problems even at low temperatures (e.g., 5° C.). Even on relatively large areas, it was possible following application of material to carry out finishing without overlap marks using a brush or roller. The coating underwent uniformly smooth leveling and made an outstanding visual impression.

Comparative Experiment C1
Preparation of a Noninventive Stain in a Walnut Shade

Example 1 was repeated but using 2,2,4-trimethyl-1,3-pentanediol monoisobutyrate instead of 2,4-diethyl-1,5-octanediol.

The noninventive architectural coating material had a persistent unpleasant odor which manifested itself interferingly during and after application. Finishing without overlap marks was not possible to the same extent as in the case of the coating material of the invention from example 1.

Example 2
Preparation of an Inventive Aqueous Semigloss Paint 53 parts by weight of the polyacrylate dispersion of example 1 were charged to a laboratory dissolver.

3.5 parts by weight of deionized water, 0.5 part by weight of wetting agent (Pigmentverteiler S from BASF AG), 2 parts by weight of propylene glycol, 1 part by weight of butyl diglycol, 0.5 part by weight of the silicone defoamer from example 1, 22 parts by weight of titanium dioxide (Kronos$^R$ 2190 from Kronos Titan GmbH), 5 parts by weight of filler (calcium carbonate; Hydrocarb$^R$ chalk from OMYA GmbH) and 1 part by weight of the associative thickener from example 1 were added individually to the polyacrylate dispersion with stirring, and stirring was continued until a particle size <15 µm was reached. Thereafter, a further 1.5 parts by weight of deionized water were added.

2.9 parts by weight of propylene glycol, 0.5 part by weight of butyl diglycol, 1 part by weight of 2,4-diethyl-1,5-octanediol, 1.8 parts by weight of the associative thickener from example 1 and 2.0 parts by weight of polyethylene wax dispersion (25%; Lanco-Glidd$^R$ W1 from Langer & Co. GmbH) were mixed with one another separately.

The resultant mixture was stirred into the dispersion described above.

The coating material of the invention had the same advantageous properties as that of example 1.

Comparative Experiment C2
Preparation of a Noninventive Aqueous Semigloss Paint

Example 2 was repeated but using 2,2,4-trimethyl-1,3-pentanediol monoisobutyrate instead of 2,4-diethyl-1,5-octanediol. The noninventive architectural coating material had an unpleasant odor and, owing to a lower open time, suffered from poor leveling.

What is claimed is:

1. An architectural coating material comprising
   a) an aqueous dispersion of at least one polyacrylate and
   b) at least one $C_9$–$C_{16}$ alkane functionalized with at least two hydroxyl groups, said alkane being selected from the group consisting of branched alkanes, cyclic alkanes, acyclic alkanes, and mixtures thereof.

2. The architectural coating material of claim 1, wherein the functionalized alkane b) is liquid at room temperature.

3. The architectural coating material of claim 2, wherein the functionalized alkane b) has a boiling point of more than 200° C.

4. The architectural coating material of claim 1, wherein the functionalized alkane b) is acyclic.

5. The architectural coating material of claim 1, wherein the functionalized alkane b) comprises hydroxyl groups selected from the group consisting of primary hydroxyl groups, secondary hydroxyl groups, and mixtures thereof.

6. The architectural coating material of claim 5, wherein the functionalized alkanes b) are selected from the group consisting of diols, triols, and mixtures thereof.

7. The architectural coating material of claim 6, wherein the functionalized alkanes b) are positionally isomeric dialkyloctanediols.

8. The architectural coating material of claim 7, wherein the functionalized alkanes b) comprise 2,4-diethyl-1,5-octanediol.

9. The architectural coating material of claim 1, wherein the functionalized alkanes b) are present therein in an amount of from 0.01 to 10% by weight, based on the overall amount of the architectural coating material of the invention.

10. The architectural coating material of claim 5, wherein the functionalized alkane b) comprises a mixture of primary and secondary hydroxyl groups.

11. The architectural coating material of claim 7, wherein the functionalized alkanes b) are positionally isomeric diethyloctanediols.

12. The architectural coating material of claim 8, wherein the functionalized alkanes b) consist of 2,4-diethyl-1,5-octanediol.

13. The architectural coating material of claim 9, wherein the functionalized alkanes b) are present therein in an amount of from 0.1 to 8% by weight, based on the overall amount of the architectural coating material of the invention.

14. The architectural coating material of claim 13, wherein the functionalized alkanes b) are present therein in an amount of from 0.5 to 5% by weight, based on the overall amount of the architectural coating material of the invention.

15. The architectural coating material of claim 14, wherein the functionalized alkanes b) are present therein in an amount of from 0.8 to 2% by weight, based on the overall amount of the architectural coating material of the invention.

* * * * *